United States Patent [19]

Rinderer

[11] Patent Number: 4,943,022
[45] Date of Patent: Jul. 24, 1990

[54] BRACKET FOR MOUNTING AN ELECTRICAL BOX ON A WALL STUD

[75] Inventor: Eric R. Rinderer, Highland, Ill.

[73] Assignee: B-Line Systems, Inc., Highland, Ill.

[21] Appl. No.: 337,148

[22] Filed: Apr. 12, 1989

[51] Int. Cl.⁵ .............................................. A47B 96/00
[52] U.S. Cl. ................... 248/205.1; 220/3.5; 248/906
[58] Field of Search ................... 248/27.1, 27.3, 205.1, 248/300, DIG. 6; 220/3.3, 3.5, 3.6, 3.9; 174/158; 52/27

[56] References Cited

U.S. PATENT DOCUMENTS

| | | | |
|---|---|---|---|
| 1,066,706 | 7/1913 | Caine . | |
| 1,855,751 | 4/1932 | Buchanan . | |
| 2,374,622 | 4/1945 | Rugg | 174/58 |
| 2,423,757 | 7/1947 | Dedge | 220/3.9 |
| 2,439,091 | 4/1948 | Keating | 248/27.1 |
| 3,360,151 | 12/1967 | Yznaga | 248/300 X |
| 3,474,994 | 10/1969 | Swanquist | 248/205.1 |
| 3,588,017 | 6/1971 | O'Brien | 248/DIG. 6 X |
| 3,588,019 | 6/1971 | Cozeck et al. | 248/228 |
| 3,606,223 | 9/1971 | Havener | 248/205 |
| 3,720,395 | 3/1973 | Schulpin | 248/205 R |
| 3,767,151 | 10/1973 | Seal et al. | 248/DIG. 6 X |
| 3,780,209 | 12/1973 | Schulpin | 174/51 |
| 3,913,773 | 10/1975 | Copp et al. | 220/3.92 |
| 4,057,164 | 11/1977 | Maier | 220/3.6 |
| 4,108,414 | 8/1978 | Grant, Sr. | 248/300 |
| 4,135,337 | 1/1979 | Medlin | 52/221 |
| 4,399,922 | 8/1983 | Horsley | 220/3.6 |
| 4,483,453 | 11/1984 | Smolik | 220/3.5 |
| 4,533,060 | 8/1985 | Medlin | 220/3.9 |
| 4,561,615 | 12/1985 | Medlin, Jr. | 248/27.1 |
| 4,569,458 | 2/1986 | Horsley | 220/3.6 |
| 4,572,391 | 2/1986 | Medlin | 220/3.9 |
| 4,603,789 | 8/1986 | Medlin, Sr. | 220/3.9 |
| 4,645,089 | 2/1987 | Horsley | 220/3.6 |
| 4,688,693 | 8/1987 | Medlin, Jr. | 220/3.9 |
| 4,787,587 | 11/1988 | Demmine | 248/205.1 |

Primary Examiner—Ramon O. Ramirez
Attorney, Agent, or Firm—Senniger, Powers, Leavitt and Roedel

[57] ABSTRACT

A bracket adapted for mounting an electrical box on a wall stud having a front face, a rear face and opposite sides. The bracket comprises a bracket plate having a front end, a rear end and a length not substantially less than the depth of the wall stud in front-to-rear direction. Ears adjacent the front end of the bracket plate are provided for attaching the bracket to the front face of the wall stud in a position in which the bracket plate extends rearwardly across one side of the wall stud from a position generally adjacent the front face of the wall stud to a position generally adjacent the rear face of the wall stud. The bracket includes tongues for affixing an electrical box to the bracket in a position wherein one side of the box is engageable with the bracket plate with the box extending in cantilever fashion laterally outwardly from the bracket plate away from the wall stud.

19 Claims, 10 Drawing Sheets

BRACKET FOR MOUNTING AN ELECTRICAL BOX ON A WALL STUD

BACKGROUND OF THE INVENTION

This invention relates generally to means for mounting electrical boxes on wall studs, and more particularly to an improved sheet metal bracket which is adapted for mounting electrical boxes of various sizes and depths on wall studs of various sizes and depths.

It is often necessary in both residential and commercial constructions to mount electrical boxes on wall studs, which may be either metal studs of channel configuration or wood studs. Various devices have been used for this purpose, including those of the type shown in U.S. Pat. Nos. 4,399,922 and 4,569,458. However, such devices have various drawbacks. For example, in some devices the procedures involved in attaching the device to the stud and the electrical box to the device are time-consuming, and the subsequent mounting of a plaster ring on the box can be even more of a burden. Also, some of these devices require the stud to be backed up against drywall or the like, which is not always the case, as where the stud is positioned adjacent an outside wall. In the latter instances the prior devices do not hold the electrical box secure against being pushed back into the wall during use. Prior devices have also blocked or severely restricted the use of knockouts in the box, thereby making wiring of the box more difficult.

Accordingly, there is a need for an improved device for mounting electrical boxes on wall studs.

SUMMARY OF THE INVENTION

Among the several objects of this invention may be noted the provision of an improved bracket for mounting an electrical box on a wall stud; the provision of such a bracket which may be used to mount electrical boxes of different depths (e.g., 1½" and 2½" depths); the provision of such a bracket which is adapted for mounting electrical boxes having different frontal dimensions (e.g., 4"×4" and 4 11/16"×4 11/16"); the provision of such a bracket which may be used to mount electrical boxes on studs of various depths; the provision of such a bracket which is adapted for mounting electrical boxes in various orientations; the provision of such a bracket which can be used to install an electrical box in a minimum of time; the provision of such a bracket where subsequent mounting of a plaster ring on the electrical box may be quickly accomplished; the provision of such a bracket which effectively and securely mounts an electrical box regardless of whether the stud backs up against a wall (e.g., drywall); the provision of such a bracket which leaves the sides and rear wall of the electrical box unobstructed for unrestricted access to the knockouts in the box; and the provision of such a bracket which is formed of sheet metal in a stamping operation for ecomical manufacture.

Generally, a bracket of the present invention for mounting an electrical box on a wall stud having a front face, a rear face and opposite sides, the bracket comprising support means having a front end, a rear end and a length not substantially less than the depth of the wall stud in front-to-rear direction. Means is provided adjacent the front end of the support means for attaching the bracket to the front face of the wall stud in a position in which the support means extends rearwardly across one side of the wall stud from a position generally adjacent the front face of the wall stud to a position generally adjacent the rear face of the wall stud. The bracket further comprises means for affixing an electrical box to said bracket in a position wherein one side of the box is engageable with the support means with the box extending in cantilever fashion laterally outwardly from the support means away from the wall stud.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
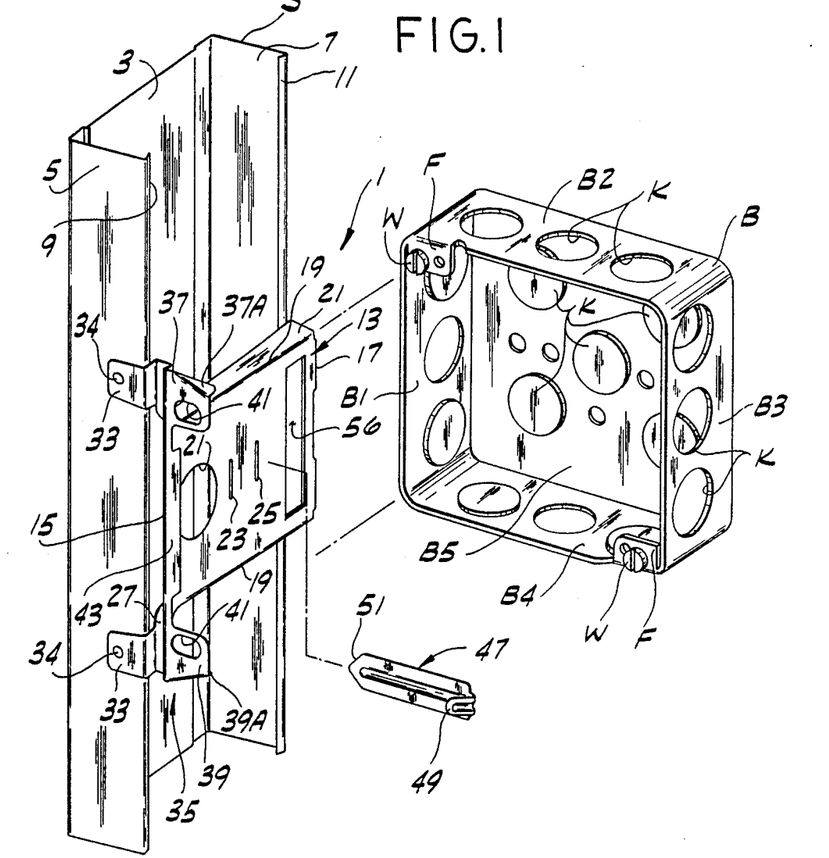
FIG. 1 is a perspective of an electrical box and a bracket constructed according to the principles of this invention mounted on a wall stud.
Figure 2:
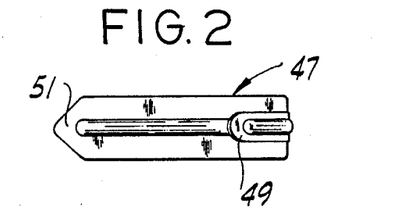
FIG. 2 is an elevation of a metal strip for holding the electrical box against rearward movement.

Referring now to the drawings, and first more particularly to FIG. 1, there is generally indicated at 1 a bracket of the present invention for mounting a standard electrical box B on a stud S. As shown, the electrical box is generally rectangular in shape, having four side walls B1-B4, a rear wall B5, and an open front. The side and rear walls have a plurality of knockouts K therein to enable conduit to be attached to the box for wiring of the box. Two mounting flanges F are provided at the front of the box carrying screws W. The stud S illustrated in the drawings is a metal stud of generally channel shape having a web 3 at one side of the stud, constituting the closed side of the stud, and generally parallel opposing flanges 5, 7 extending laterally outwardly from the web, one flange 5 constituting a front flange at the front of the stud and the other flange 7 constituting a rear flange at the rear of the stud. The flanges have inwardly bent outer edges forming inturned lips 9, 11 defining therebetween an open side of the stud. While a metal stud is shown in the drawings, it will be understood that the bracket of the present invention is also adapted for use with a conventional wood stud of rectangular cross section.

More specifically, the bracket 1 is of sheet metal construction and comprises support means in the form of a generally rectangular bracket plate, indicated generally at 13, having a front edge 15 at its front end, a rear edge 17 at its rear end, opposite side edges 19 and a length not substantially less than the depth of the wall stud S in front-to-rear direction. The bracket plate 13 has a circular opening 21 generally adjacent its front edge 15 in a position generally corresponding to a knockout K in sidewall B1 of of the electrical box B to enable this knockout to be used. The bracket plate also has first and second spaced-apart parallel vertical slots 23,25 therein generally midway between the side edges of the plate. The purpose of these slots will be explained later. A pair of long relatively narrow reinforcing flanges 27 (constituting flange means) extend along the side edges 19 of the bracket plate in planes generally perpendicular to the plate and are engageable with the stud S. A pair of relatively narrow but shorter spaced-apart flanges 29 are bent from the rear edge 17 of the bracket plate 13 and extend laterally inwardly to overlay the rearward face of the rear flange 7 of the stud S to prevent slippage of the bracket plate 13 into the open side of the stud.

The bracket 1 also includes a pair of ears 33 integrally formed with vertical extensions of the flanges 27 at the front of the bracket 1. These ears 33 extend laterally inwardly (to the left as viewed in FIG. 1) with respect to the bracket plate 13 in a plane generally at right angles to the plane of the bracket plate for face-to-face engagement with the front face of the front flange 5 of the stud S and constitute means for attaching the bracket to the stud. The ears 33 are provided with openings 34 for receiving fasteners (e.g., screws or nails) for this purpose.

Indicated generally at 35 is means for affixing the electrical box B to the bracket 1, the affixing means comprising a pair of tongues designated 37 and 39 integrally formed with the vertical extensions of the flanges 27 adjacent the two ears 33 at the front of the bracket. These tongues 37,39 extend laterally outwardly with respect to the bracket plate 13 (to the right as viewed in FIG. 1) in a plane generally at right angles to the plane of the bracket plate. The tongues are provided with holes 41. Regardless of the orientation of the box B, one of the mounting screws W at diagonally opposite corners of the box will be positioned for reception through a hole 41 in one of the tongues. For the relatively small box B shown in FIG. 1 (which may have 4"×4" frontal dimensions), the only function performed by the screw extending through one such hole is to prevent relative vertical movement between the box and the bracket. The upper portion 37A of the upper tongue 37 and the lower portion 39A of the lower tongue 39 are bent rearwardly for reasons which will become apparent.

A relatively long clip member 43 extends along the the front edge 15 of the bracket plate 13 in the area between the tongues 37,39. This clip member is bent rearwardly from the front edge 15 of the bracket plate 13 and forms, conjunction with the bracket plate, a channel 45 for receiving the front edge of sidewall B1 of the box B to prevent lateral movement of the box away from the bracket plate and forward movement of the box relative to the bracket plate. The clip member 43 is resilient and designed to spring away from the bracket plate 13 as the edge of the box is inserted in the channel, and to exert a clamping force against the side wall B1 of the box when the latter is fully inserted in the channel 45. The rearward edge 46 of the clip member is flared outwardly to facilitate entry of the edge of the box into the channel.

Figure 3:
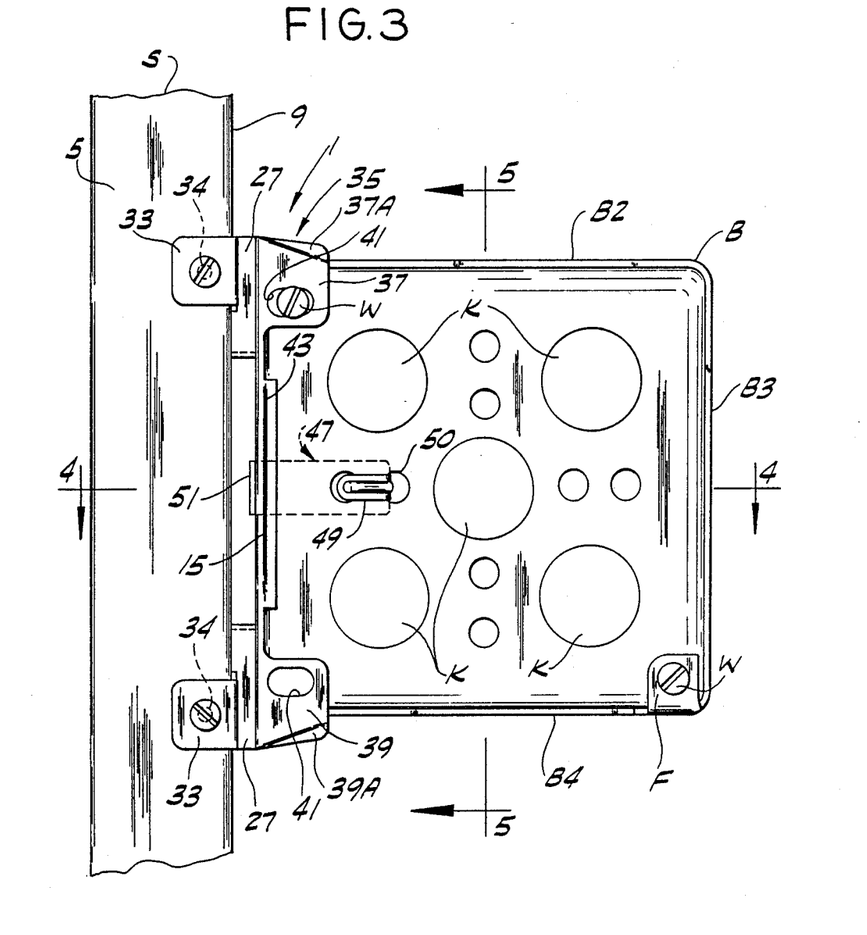
FIG. 3 is a front elevation of the electrical box mounted on the bracket.
Figure 4:
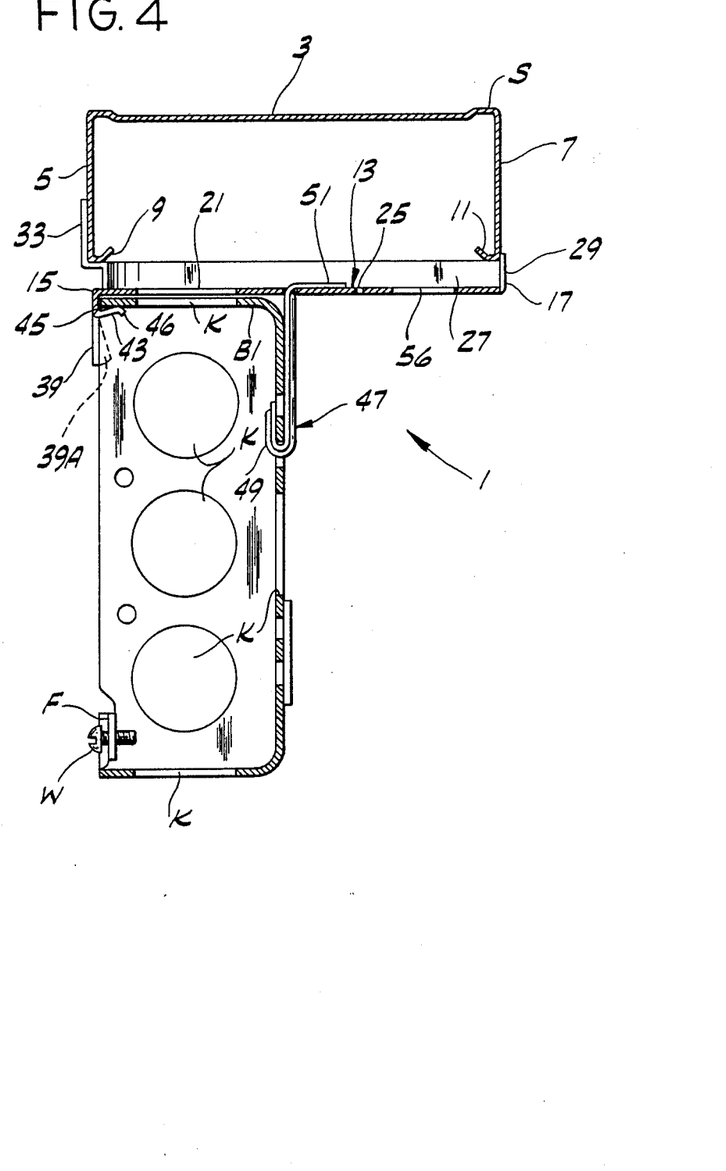
FIG. 4 is a horizontal section taken on the plane including the line 4—4 of FIG. 3.
Figure 5:
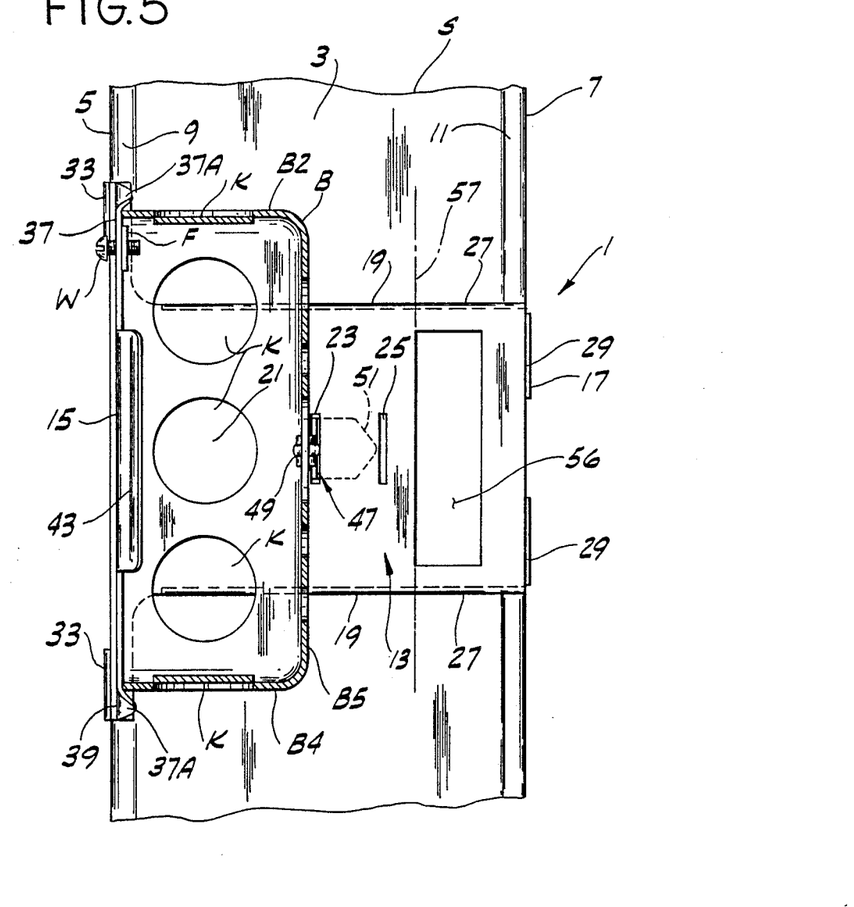
FIG. 5 is a vertical section taken on the plane including the line 5—5 of FIG. 3.
Figure 9:
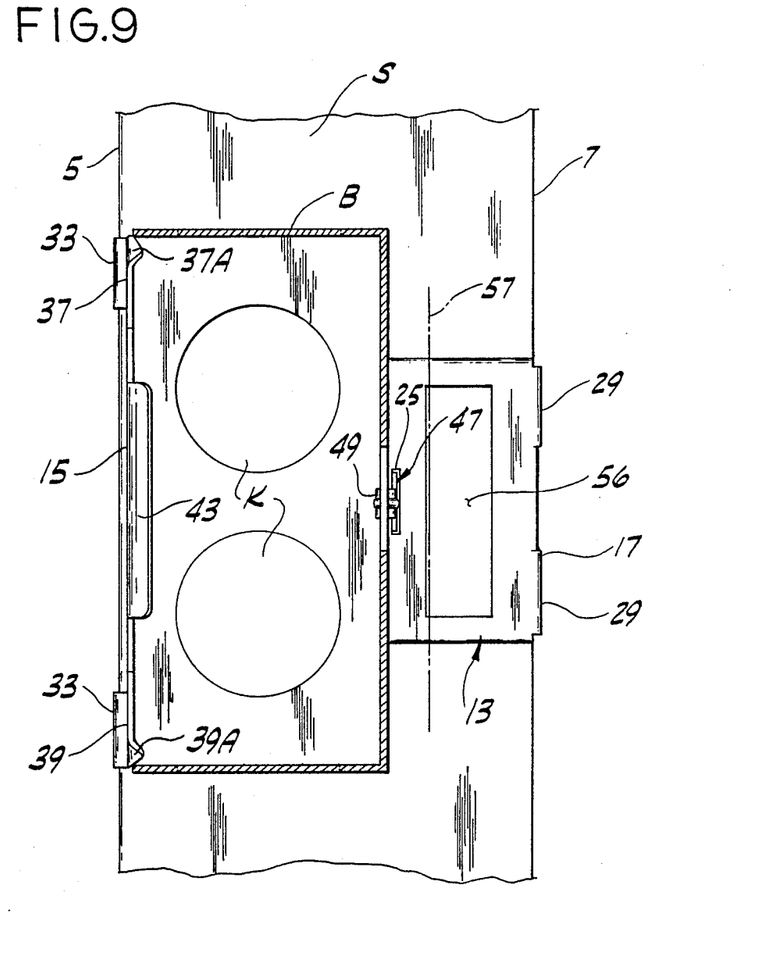
FIG. 9 is a vertical section taken on the plane including line 9—9 of FIG. 8.

To hold the box B against rearward movement relative to the bracket plate 13, holding means is provided comprising a bendable flat metal strip generally indicated at 47, adapted for face-to-face engagement with the rear wall B5 of the box B. The strip 47 has a first end portion in the form of a relatively narrow tab 49 for insertion through a hole 50 in the rear wall of the box, and a second tapered end portion 51 adapted for insertion through the first slot 23 in the bracket plate. The tab 49 is adapted to be bent to extend inwardly generally parallel to the rear wall B5 of the box and the tapered end portion 51 is adapted to be bent to extend rearwardly generally parallel to the inside face of the bracket plate 13 (see FIGS. 3 and 4). The arrangement is such that when the end portions 49,51 of the metal strip are bent in this configuration, the strip holds the box secure against rearward movement relative to the bracket 1. The electrical box illustrated in the drawings is a relatively shallow box (e.g., 1½ in.) If a deeper box is to be mounted (e.g., a 2⅛ in.-deep box), the tapered end portion 51 of the bendable metal strip should be inserted through the second slot 25, as shown in FIG. 9. The spacing of the flanges 29 at the rear of the bracket plate 13 allows the bendable strip 47 to be inserted through the rear slot 25 and bent rearwardly without interference from those flanges.

Figure 6:
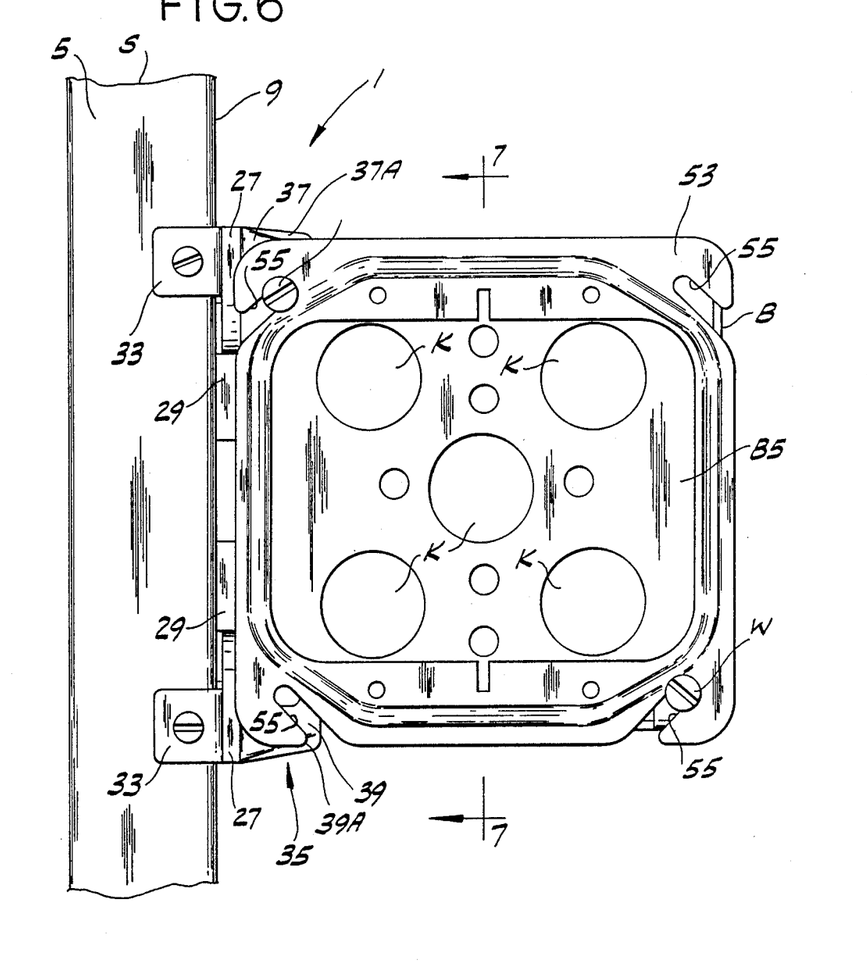
FIG. 6 is a front elevation similar to FIG. 3 but showing a plaster ring mounted on the electrical box.
Figure 7:
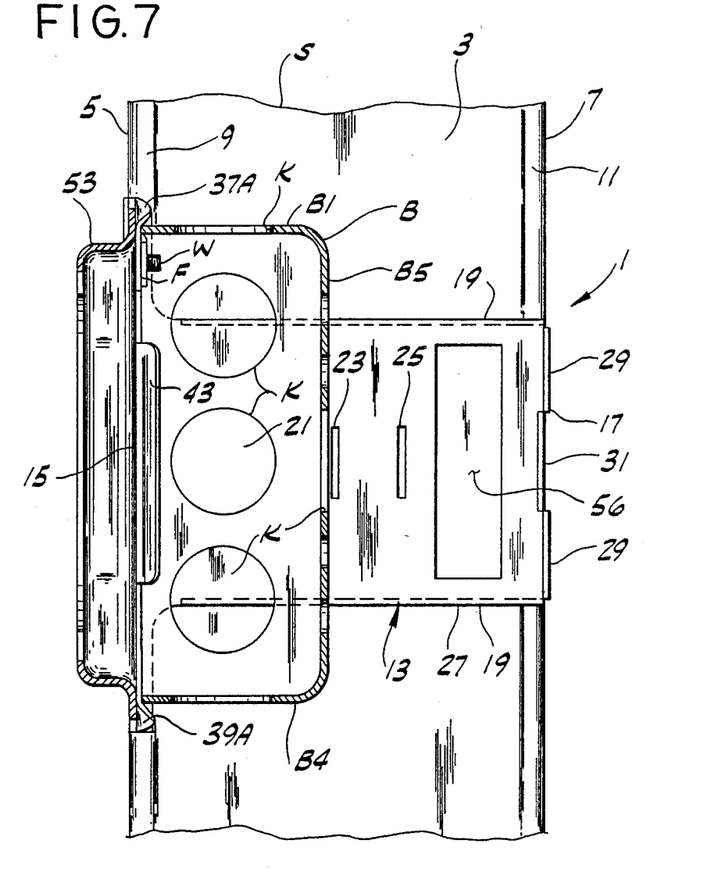
FIG. 7 is a vertical section taken on the plane including line 7—7 of FIG. 6.

It is significant to note that it is not necessary to tighten the mounting screws W against the tongues 37,39 on the bracket 1 when installing the box B on the bracket, since the mounting screws W function only to hold the box against vertical movement relative to the bracket. This is advantageous because it facilitates application of a plaster ring 53 to the electrical box B at a later time, in the event this is necessary. Since the mounting screws are not tight, the edge of the plaster ring 53 is merely applied to the front of the box with the mounting screws W received in slots 55 in the periphery of the ring, as shown in FIGS. 6 and 7, and the mounting screws then tightened to secure the ring in position. There is no need to first loosen the mounting screws (as in certain prior art devices) and then retighten them. If a plaster ring 53 is applied to the electrical box B initially, it will be understood that there is no need to use the bendable metal strip 47 since rearward movement of the box relative to the bracket is prevented by the attachment of the box to the plaster ring via the mounting screws.

It will be observed that the electrical box B shown in FIGS. 1-7 can be mounted in any orientation using the bracket 1 of the present invention.

Figure 8:
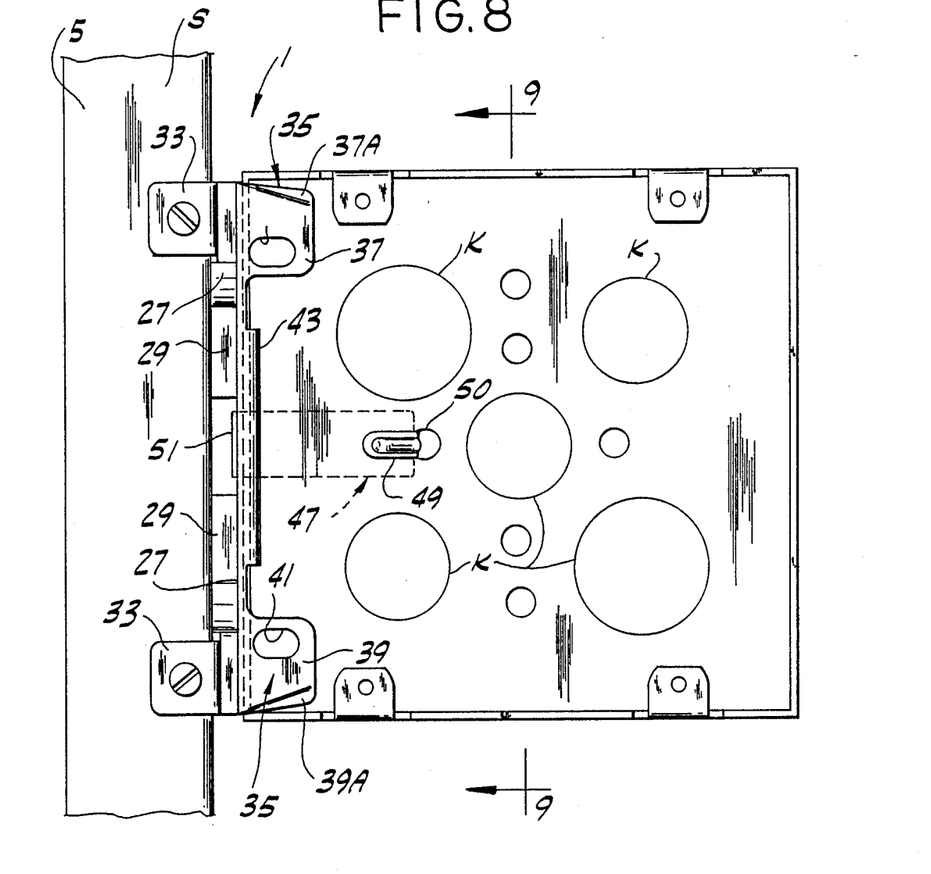
FIG. 8 is a front elevation similar to FIG. 3.

Referring now to FIGS. 8 and 9, the same bracket 1 is shown as used to mount a larger electrical box B (e.g., with front dimensions of 4 11/16 in. ×4 11/16 in.) on a metal wall stud S. In this situation the box is mounted on the bracket in the same way as with the smaller box B, except that the tongues 37,39 of the bracket do not receive mounting screws W. Rather the bent portions 37A,39A of the tongues are engageable with the upper and lower sides of the box B to prevent any substantial vertical movement of the box relative to the bracket. This is true regardless of how the box is oriented relative to the bracket. The larger box is also generally deeper, so that the bendable metal strip 47 is inserted through the second (rearward) slot 25 in the bracket plate, as shown in FIG. 9, to hold the box B secure against rearward movement relative to the bracket plate 13.

It will be understood that the length of the bracket plate 13 in front-to-rear direction may be varied to accomodate metal studs of different depths (i.e., studs having different front-to-rear dimensions, such as 2½ in. and 3⅜ in.). Alternatively, a relatively large opening 56 may be provided generally adjacent the rear edge 17 of the bracket plate 13 for this purpose. As shown in FIG. 9, this opening may be located immediately rearward of the second slot 25 and should be sufficiently wide to enable a cutting tool to be used to manually cut the bracket plate along a cut line 57 to cut off the rearward portion of the bracket plate and thus shorten it for use on a shallower stud. By way of illustration, the bracket as shown in FIG. 1 may be suited for a stud having a depth of 3⅜ in. To make the bracket suitable for use on a 2½ in. stud, for example, one merely has to cut the bracket along line 57 to shorten it. The shorter bracket operates in the same way as the longer one. While the opening is illustrated as being rectangular, it may assume other shapes.

Figure 10:
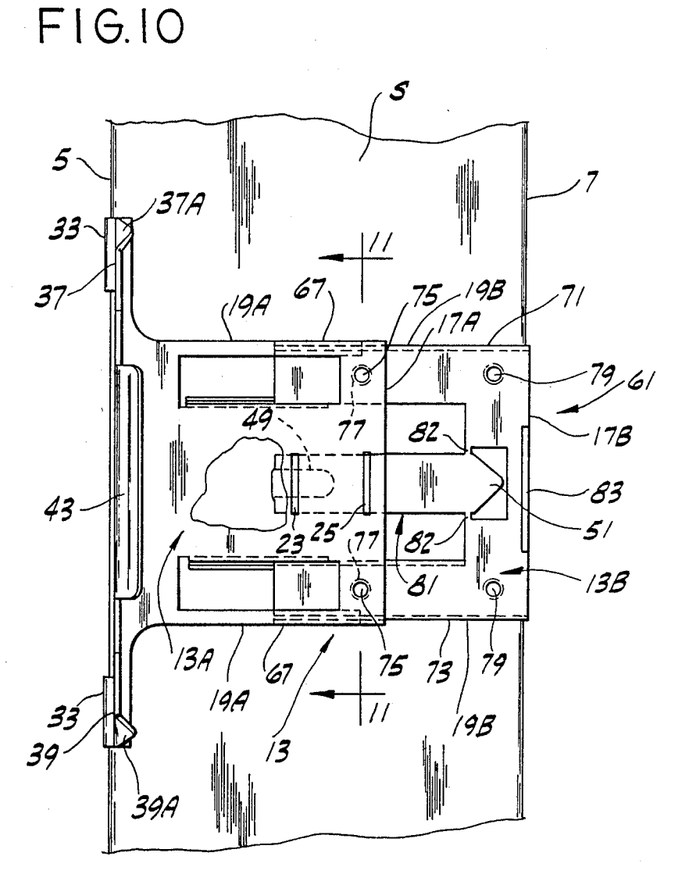
FIG. 10 is a side elevation of a wall stud having an electrical box and a second embodiment of a bracket constructed according to the principles of this invention mounted thereon.
Figure 11:
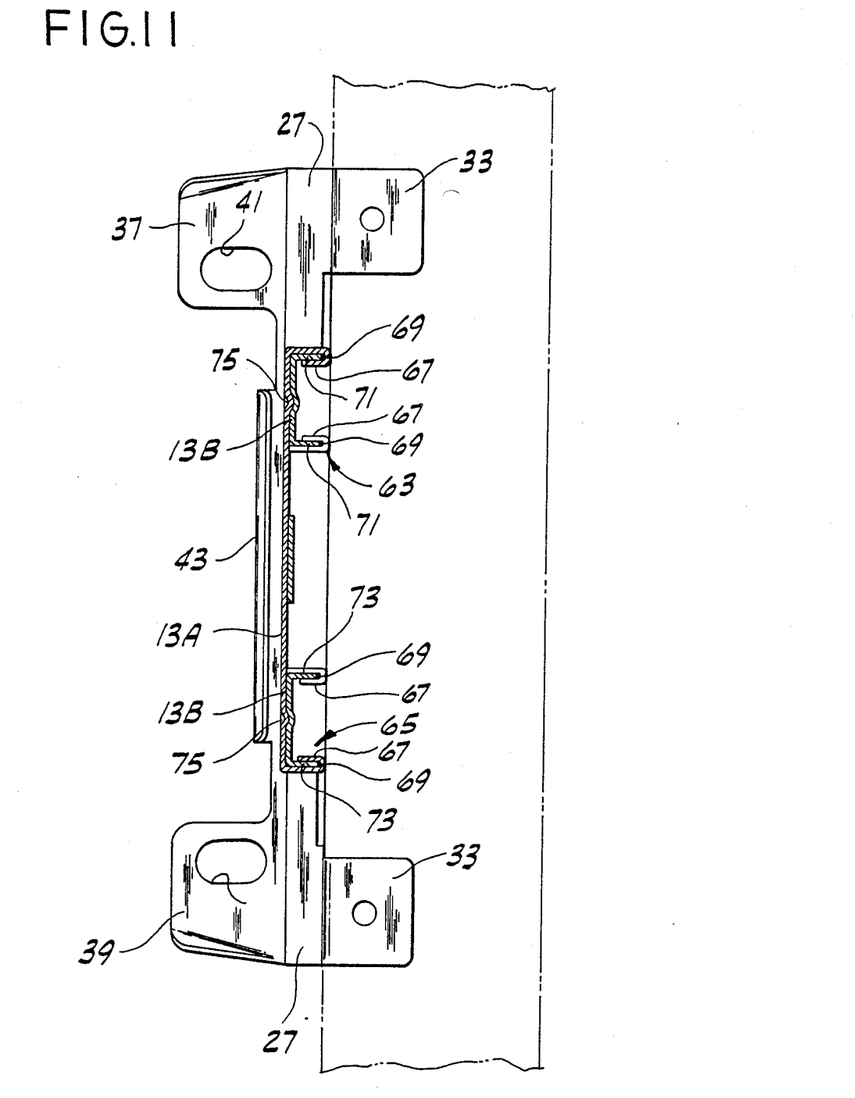
FIG. 11 is a vertical section taken on the plane including line 11—11 of FIG. 10.

Still another way of accommodating studs of different depths is illustrated in FIGS. 10 and 11. The bracket there depicted, generally designated 61, is similar in most respects to the bracket previously described and corresponding parts are designated by the same reference numerals. The primary difference is that the bracket plate 13 comprises a pair of separate bracket plate members 13A,13B (instead of a single member) having a telescopic fit for enabling lengthwise adjustment of the bracket. The front bracket plate member 13A is formed with track means comprising two tracks, indicated generally at 63,65 respectively, on its inner face (the face toward the wall stud) extending in front-to-rear direction adjacent opposite side edges 19A of the bracket plate member 13A. Each track is formed by opposing flanges 67 having end portions bent back on themselves to form generally U-shaped grooves 69. The rear bracket plate member 13B is formed with slide means comprising two pairs of slide members 71,73 on the inner face of the bracket member extending in front-to-rear direction adjacent opposite sides edges of the bracket plate member. These slide members are slidably receiveable in the grooves 69 defined by the tracks 63,65 on the front bracket plate member 13A so that the two bracket plate members 13A,13B may be telescopically adjusted.

To hold the two bracket plate members 13A,13B in appropriate positions of lengthwise adjustment (corresponding to the depth of the wall stud), means is provided comprising two dimples, each designated 75, in the front bracket plate member adjacent its rear edge 17A toward opposite sides thereof, and two pairs of dimples in the rear bracket plate member, each dimple of the forward pair being designated 77 and each dimple of the rearward pair being designated 79. The latter two pairs of dimples are resiliently interengageable with the dimples 75 on the front bracket plate member 13A releasably to hold the bracket plate members 13A,13B in one of two selected positions, each position corresponding to a stud of predetermined depth. Thus, using this arrangement, the bracket 1 may be adjusted to fit either of two stud depths. It is contemplated that the bracket 1 may be modified in other ways to accommodate studs of different depths.

As illustrated in FIG. 10, a bendable metal strip 81 comparable to the strip 47 previously described is integrally formed (as in a stamping operation) with the rear bracket plate member 13B and has break-away connections 82 with the bracket plate member 13B to enable the strip to be easily removed and used in the manner described above, if necessary. The bendable strip 81 could be similarly attached to the bracket plate shown in FIGS. 1–7. It could also be attached in other ways, or be entirely separate from the bracket plate.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is

1. A sheet metal bracket adapted for mounting an electrical box on a wall stud having a front face, a rear face and opposite sides, said bracket comprising
    sheet metal support means having a front end, a rear end and a length not substantially less than the depth of the wall stud in front-to-rear direction,
    sheet metal means adjacent the front end of said support means for attaching the bracket to the front face of the wall stud in a position in which said support means extends rearwardly across one side of the wall stud from a position generally adjacent the front face of the wall stud to a position generally adjacent the rear face of the wall stud, and sheet metal means integral with said support means for affixing an electrical box to said bracket in a position wherein one side of the box is engageable with said support means with the box extending in cantilever fashion laterally outwardly from said support means away from the wall stud.

2. A bracket as set forth in claim 1 wherein said support means comprises a bracket plate having a front edge, a rear edge and opposite side edges.

3. A bracket adapted for mounting an electrical box on a wall stud having a front face, a rear face and opposite sides, said bracket comprising
    support means having a front end, a rear end and a length not substantially less than the depth of the wall stud in front-to-rear direction, said support means comprising a bracket plate having a front edge, a rear edge and opposite side edges, said bracket plate having flange means along its side edges engageable with the wall stud,
    means adjacent the front end of said support means for attaching the bracket to the front face of the wall stud in a position in which said support means extends rearwardly across one side of the wall stud from a position generally adjacent the front face of the wall stud to a position generally adjacent the rear face of the wall stud, and
    means for affixing an electrical box to said bracket in a position wherein one side of the box is engageable with said support means with the box extending in cantilever fashion laterally outwardly from said support means away from the wall stud.

4. A bracket as set forth in claim 1 wherein said means adjacent the front edge of the bracket plate for attaching the bracket comprises a pair of ears extending laterally from said support means for face-to-face engagement with the front face of the wall stud, each ear having an opening therein for receiving a fastener therethrough.

5. A bracket adapted for mounting an electrical box on a wall stud having a front face, a rear face and opposite sides, said bracket comprising support means having a front end, a rear end and a length not substantially less than the depth of the wall stud in front-to-rear direction, means adjacent the front end of said support means for attaching the bracket to the front face of the wall stud in a position in which said support means extends rearwardly across one side of the wall stud from a position generally adjacent the front face of the wall stud to a position generally adjacent the rear face of the wall stud, and means for affixing an electrical box to said bracket in a position wherein one side of the box is engageable with said support means with the box extending in cantilever fashion laterally outwardly from said support means away from the wall stud, said means for affixing an electrical box to said bracket comprising a pair of tongues extending laterally outwardly from said support means, holes in the tongues for receiving therethrough one or more mounting screws of the electrical box, and clip means on said support means between said tongues engageable with an edge of said one side of the electrical box to prevent lateral movement of the box away from said support means and forward movement of the box relative to said support means.

6. A bracket as set forth in claim 5 wherein said tongues have rearwardly bent portions engageable with opposite walls of an electrical box to hold the box in substantially fixed vertical position relative to said support means.

7. A bracket as set forth in claim 5 wherein said support means comprises a bracket plate having a front edge, a rear edge and opposite side edges.

8. A bracket as set forth in claim 7 wherein said clip means comprises a clip member along the front edge of the bracket plate forming, in conjunction with the bracket plate, a channel for receiving said edge of the electrical box therein.

9. A bracket as set forth in claim 7 further comprising holding means associated with the bracket plate engageable with a rear wall of the electrical box for holding the box against rearward movement of the box relative to the bracket plate.

10. A bracket as set forth in claim 9 wherein said bracket plate has a first slot therein, said holding means comprising a bendable metal strip adapted for engagement with the rear wall of the electrical box, said strip having a first end portion adapted for insertion through a hole in the rear wall of the electrical box and a second end portion adapted for insertion through said first slot in the bracket plate, said first end portion being adapted to be bent to extend generally parallel to the rear wall of the box and said second end portion being adapted to be bent to extend generally parallel to the bracket plate.

11. A bracket as set forth in claim 10 wherein said bendable metal strip is connected to said bracket plate by means of a frangible connection adapted to be broken for enabling the strip to be removed from the bracket plate for use.

12. A bracket as set forth in claim 10 further comprising a second slot in the bracket plate spaced rearwardly from the first slot.

13. A bracket as set forth in claim 1 wherein said support means comprises a bracket plate constituted by a single bracket plate member.

14. A bracket adapted for mounting an electrical box on a wall stud having a front face, a rear face and opposite sides, said bracket comprising support means having a front end, a rear end and a length not substantially less than the depth of the wall stud in front-to-rear direction, said support means comprising a pair of bracket plate members having a telescopic fit for enabling lengthwise adjustment to accommodate wall studs of different depths, means adjacent the front end of said support means for attaching the bracket to the front face of the wall stud in a position in which said support means extends rearwardly across one side of the wall stud from a position generally adjacent the front face of the wall stud to a position generally adjacent the rear face of the wall stud, and means for affixing an electrical box to said bracket in a position wherein one side of the box is engageable with said support means with the box extending in cantilever fashion laterally outwardly from said support means away from the wall stud.

15. A bracket as set forth in claim 14 further comprising means for holding said bracket plate members in different positions of lengthwise adjustment.

16. A bracket as set forth in claim 14 further comprising track means on one bracket plate member and slide means on the other bracket plate member slidable in said track means.

17. A bracket as set forth in claim 13 wherein said bracket plate member has a relatively large opening therein generally adjacent the rear of the bracket plate member for readily enabling a rearward portion of the bracket plate member to be cut off for the purpose of shortening the bracket plate member to accommodate a wall stud of shallower dimension in front-to-rear direction.

18. A bracket as set forth in claim 1 wherein said support means comprises a sheet metal bracket plate, wherein said attaching means comprises a pair of ears integrally formed with said bracket plate and bent to extend laterally therefrom for face-to-face engagement with the front face of the wall stud, and wherein said affixing means comprises a pair of tongues integrally formed with said bracket plate and bent to extend laterally therefrom in a direction opposite said ears, said tongues having holes therein for receiving one or more mounting screws of an electrical box.

19. In combination with a metal wall stud of generally channel shape having a web at one side of the stud, constituting the closed side of the stud, generally parallel opposing flanges extending laterally outwardly from the web, one flange constituting a front flange at the front of the stud and the other flange constituting a rear flange at the rear of the stud, said flanges defining therebetween an open side of the stud, a sheet metal bracket adapted for mounting an electrical box on the stud, said bracket comprising sheet metal support means having a front end, a rear end and a length not substantially less than the depth of the wall stud in front-to-rear direction, sheet metal means adjacent the front end of said support means for attaching the bracket to the front flange of the wall stud either in a first position at the closed side of the stud in which said support means extends rearwardly across the closed side of the wall stud from a position generally adjacent the front face of the wall stud to a position generally adjacent the rear face of the wall stud, or in a second position at the open side of the stud in which said support means spans the front and rear flanges of the stud, and sheet metal means integral with said support means for affixing an electrical box to said bracket in a position wherein one side of the box is engageable with said support means with the box extending in cantilever fashion laterally outwardly from said support means away from the wall stud.

* * * * *